United States Patent
Kawakami et al.

(10) Patent No.: US 10,079,103 B2
(45) Date of Patent: Sep. 18, 2018

(54) MULTILAYER ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Tetsuo Kawakami, Nagaokakyo (JP); Takahiro Hirao, Nagaokakyo (JP); Tsutomu Tanaka, Nagaokakyo (JP); Tomohiro Kageyama, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/337,261

(22) Filed: Oct. 28, 2016

(65) Prior Publication Data
US 2017/0125167 A1 May 4, 2017

(30) Foreign Application Priority Data

Oct. 30, 2015 (JP) .................... 2015-214568

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/236* | (2006.01) |
| *H01G 4/232* | (2006.01) |

(52) U.S. Cl.
CPC ............ *H01G 4/30* (2013.01); *H01G 4/008* (2013.01); *H01G 4/012* (2013.01); *H01G 4/12* (2013.01); *H01G 4/232* (2013.01); *H01G 4/236* (2013.01)

(58) Field of Classification Search
CPC .......... H01G 4/30; H01G 4/008; H01G 4/012; H01G 4/12; H01G 4/232; H01G 4/236
USPC ....................................... 361/306.3
See application file for complete search history.

(56) References Cited

U.S. PATENT DOCUMENTS

| | | | | |
|---|---|---|---|---|
| 6,104,129 | A * | 8/2000 | Okamoto ............. | H01L 41/293 310/366 |
| 7,262,952 | B2 * | 8/2007 | Lee ....................... | H01G 4/232 361/306.1 |
| 2006/0250747 | A1 | 11/2006 | Takashima et al. | |
| 2007/0216265 | A1 * | 9/2007 | Cooke ................. | H01L 41/0833 310/366 |
| 2013/0093556 | A1 | 4/2013 | Lim | |
| 2017/0011850 | A1 * | 1/2017 | Kim ...................... | H01G 4/08 |

FOREIGN PATENT DOCUMENTS

| | | |
|---|---|---|
| JP | 09-129476 A | 5/1997 |
| JP | 2005-340664 A | 12/2005 |
| JP | 2005-347509 A | 12/2005 |

(Continued)

*Primary Examiner* — Michael P McFadden
(74) *Attorney, Agent, or Firm* — Keating & Bennett, LLP

(57) ABSTRACT

A multilayer electronic component includes outer electrodes each including an outer electrode main body electrically conducted to an internal electrode and entering portions that project from the outer electrode main body as a base end and enter into the electronic component element through an end surface of the electronic component element. The entering portions each include a slope relative to a principal surface in a flat region including a major portion of the internal electrode.

15 Claims, 6 Drawing Sheets

(56) References Cited

FOREIGN PATENT DOCUMENTS

| JP | 2006-100498 A | 4/2006 |
| JP | 2013-084871 A | 5/2013 |
| JP | 2013-157387 A | 8/2013 |

\* cited by examiner

MULTILAYER ELECTRONIC COMPONENT AND MANUFACTURING METHOD THEREFOR

CROSS REFERENCE TO RELATED APPLICATIONS

This application claims the benefit of priority to Japanese Patent Application 2015-214568 filed on Oct. 30, 2015. The entire contents of this application are hereby incorporated herein by reference.

BACKGROUND OF THE INVENTION

1. Field of the Invention

The present invention relates to a multilayer electronic component and a manufacturing method for a multilayer electronic component, and specifically relates to a multilayer electronic component including an outer electrode and a manufacturing method for a multilayer electronic component including an outer electrode.

2. Description of the Related Art

A multilayer ceramic capacitor, which is a typical multilayer electronic component, has a structure in which an outer electrode is provided on a ceramic element including a plurality of internal electrodes opposed to each other with a ceramic layer located between the plurality of internal electrodes, so as to be electrically conducted to the internal electrodes.

Japanese Unexamined Patent Application Publication No. 9-129476 discloses a multilayer ceramic capacitor 101 in which, as shown in FIG. 6, dummy internal electrodes 114 are provided in an electronic component element 102 such that portions thereof are exposed on end portions 102a and 102b of the electronic component element 102, and outer electrodes 105 are joined to exposed portions of ceramic layers 103 and internal electrodes 104 that form the electronic component element 102 and also joined to the exposed portions of the dummy internal electrodes 114.

In the multilayer ceramic capacitor 101, the strength of connection between the outer electrodes 105 and the electronic component element 102 is enhanced by connecting the dummy internal electrodes 114 to the outer electrodes 105.

However, in the multilayer ceramic capacitor disclosed in Japanese Unexamined Patent Application Publication No. 9-129476, when a force that pulls the outer electrodes 105 acts in a direction perpendicular to the end portions 102a and 102b of the electronic component element 102, since each outer electrode 105 and each dummy internal electrode 114 are generally made of different materials, there is a problem that they are easily separated from each other at the joint between the outer electrode 105 and the dummy internal electrode 114, so that the outer electrode 105 peels off from the electronic component element 102.

In addition, the dummy internal electrodes 114 are connected to the outer electrodes 105 in the direction perpendicular to the end portions 102a and 102b of the electronic component element 102. Thus, when a force that pulls the outer electrodes 105 acts in the direction perpendicular to the end portions, there is a problem that the dummy internal electrodes 114 are easily pulled out from the electronic component element 102, and peel off together with the outer electrodes 105.

SUMMARY OF THE INVENTION

Preferred embodiments of the present invention provide a multilayer electronic component with a high connection strength between an electronic component element with a plurality of internal electrodes and an outer electrode on an end portion of the electronic component element, and a method for efficiently manufacturing a multilayer electronic component with a high connection strength between an electronic component element and an outer electrode.

According to a preferred embodiment of the present invention, a multilayer electronic component includes an electronic component element including a plurality of insulating material layers that include an insulating material, and a plurality of internal electrodes that include an electrode material, the electronic component element including a structure in which extended portions that are portions of the plurality of internal electrodes are extended to end portions of a multilayer body in which the plurality of internal electrodes are laminated with the insulating material layer located between the plurality of internal electrodes; and outer electrodes disposed at end portions of the electronic component element are electrically conducted to the extended portions of the plurality of internal electrodes, wherein each of the outer electrodes includes an outer electrode main body electrically conducted to the internal electrode and a plurality of entering portions that project from the outer electrode main body as a base end in a layer shape, enter into inside of the electronic component element from the end portion of the electronic component element, and include a material that is the same or substantially the same as that of the outer electrode main body, and at least one of the entering portions in the layer shape includes a slope relative to a principal surface in a flat region including a major portion of the internal electrode.

A multilayer electronic component according to a preferred embodiment of the present invention is configured as described above, and each of the outer electrodes includes an outer electrode main body electrically conducted to the internal electrode, and a plurality of entering portions that project from the outer electrode main body as a base end in a layer shape and enter into the electronic component element through the end portion of the electronic component element. Thus, each outer electrode is assuredly secured to and firmly held by the end portion of the electronic component element, for example, by joining of the outer electrode main body and the electronic component element, joining of each entering portion and the electronic component element, and engagement between a recess and a projection present on each entering portion and the electronic component element.

Since the outer electrode main body and the entering portions that define the outer electrode are integral, unitary and are made of the same or substantially the same material, separation between both is less likely to occur, and the reliability of joining the outer electrode to the electronic component element is enhanced.

Since the at least one of the entering portions includes a slope relative to a principal surface in a flat region including a major portion of the internal electrode, even if a force is applied in a direction parallel or substantially parallel to the principal surface of the internal electrode, the entering portions are less likely to easily come out. Accordingly, the reliability of joining the outer electrode to the electronic component element is enhanced.

The outer electrode including the entering portions provides high reliability of joining to the electronic component element as described above, even if the distance by which each entering portion enters is reduced. Thus, a region that contributes to exhibition of the electrical characteristics of the electronic component element (e.g., an opposed area of a pair of internal electrodes in the case of a multilayer ceramic capacitor) is increased, and a multilayer electronic component with favorable electrical characteristics is able to be obtained.

According to various preferred embodiments of the present invention, there are no special limitations on the type of the insulating material, and various materials that do not have electrical conductivity, such as a dielectric material, a magnetic material, a piezoelectric material, and a resin material, may be included.

In a multilayer electronic component according to a preferred embodiment of the present invention, for example, a dielectric material such as barium titanate, a magnetic material such as ferrite, a piezoelectric material such as PZT, or a resin material such as epoxy resin may be included as the insulating material.

Ni, Ag, Pd, Au, Cu, or an alloy including Ni, Ag, Pd, Au, or Cu as a principal component may be included in each internal electrode and each outer electrode, that is, as the conductive materials.

The types of the conductive materials included in each internal electrode and each outer electrode may be different from each other.

According to a preferred embodiment of the present invention, in a multilayer electronic component, the at least one of the entering portions preferably includes a base end portion with a thickness larger than that of a distal end portion of the entering portions and larger than that of the internal electrode, for example.

When the thickness of the base end portion of the at least one of the entering portions is larger than the thickness of the distal end portion of the at least one of the entering portions and is larger than the thickness of the internal electrode, the strength of a connection portion between the outer electrode main body and the entering portion is enhanced and peeling of the outer electrode from the electronic component element is prevented or significantly reduced.

When the thickness of the base end portion of the at least one of the entering portions is larger than the thickness of the distal end portion of the at least one of the entering portions (that is, the distal end portion is thinner), for example, in a substantially wedge shape, even if a force to pull out the entering portion from the electronic component element is applied, the force is divided into forces corresponding to the shape of the wedge-shaped portion of the entering portion, and the entering portion is less likely to be dislodged from the electronic component element. Accordingly, the reliability of joining the outer electrode to the electronic component element is enhanced.

The at least one of the entering portions preferably includes a curved shape from a base end portion to a distal end portion of the at least one of the entering portions, for example.

When the at least one of the entering portions includes a curved shape from the base end portion to the distal end portion of the at least one of the entering portions, the entering portion is much less likely to come out from the electronic component element. Accordingly, the reliability of joining the outer electrode to the electronic component element is enhanced.

Preferably, each of the outer electrodes and the internal electrodes includes a metallic material as a principal component, and a common material with a composition equivalent to or the same as that of the material of each insulating material layer, and a content ratio of the common material in the outer electrode is higher than a content ratio of the common material in the internal electrode, for example.

Here, "with a composition equivalent to" is defined as "including an insulator material as a principal component and may include various additives in a small amount". The insulator material may not be the same as the material included in each insulating material layer, as long as the difference in thermal expansion amount or thermal contraction amount from the material of each insulating material layer is small. In addition, the additives are included for purposes such as (1) promoting solidification, or significantly reducing or preventing damage to the multilayer body such as crack, when solidification of the multilayer body is performed, (2) improving the structural or performance function of the electronic component, and (3) controlling damage to the multilayer body such as crack when the multilayer body is crystalized by firing or the like.

With the features described above, the difference in thermal expansion amount or thermal contraction amount between the materials of each outer electrode and each insulating material layer is decreased, so that it is possible to inhibit a structural defective such as crack from occurring in the electronic component element.

A material with the same or substantially the same composition as the material of each insulating material layer is preferably included as the common material. A material with a similar basic composition may be included.

The common material in an extended portion of each outer electrode is preferably connected to each of the insulating material layers above and below the extended portion, for example.

The material included in each insulating material layer is preferably a ceramic material, for example.

According to a preferred embodiment of the present invention, in a multilayer electronic component, the material included in each insulating material layer is preferably a dielectric material, for example.

When the material of each insulating material layer is a dielectric material, for example, it is possible to obtain a multilayer electronic component such as a multilayer ceramic capacitor.

When the material of each insulating material layer is a dielectric material, the "common material with a composition equivalent to or the same as that of the material of each insulating material layer" defines a material that meets the following condition.

A ceramic material preferably includes $ABO_3$ as a principal component: A is at least one of Ba, Ca, and Sr, and B is at least one of Ti, Zr, and Hf.

When the material of each insulating material layer is a dielectric material, it is possible for each entering portion to alleviate a difference in contraction between the insulating material layer and the outer electrode during firing.

According to a preferred embodiment of the present invention, a manufacturing method for a multilayer electronic component is a manufacturing method for the multilayer electronic component, and includes the steps of supplying an insulating material ink including the insulating material included in each insulating material layer, to form a first insulating material pattern including a chamfered shape in which a boundary portion between an end portion and an upper surface is tilted relative to the upper surface or rounded; supplying an outer electrode ink including a conductive material included in each outer electrode, to a chamfered shape region including the chamfered shape of the boundary portion of the first insulating material pattern and a region in which the first insulating material pattern is not formed, the region which is adjacent to or in a vicinity of the end portion of the first insulating material pattern, and forming a first outer electrode pattern to provide the entering portion and a portion of the outer electrode; supplying the insulating material ink to a region of a surface of the first insulating material pattern in which the entering portion of the first outer electrode pattern is located, and a region in which the first insulating material pattern is exposed, to form a second insulating material pattern overlapping the first insulating material pattern and including the boundary portion including the chamfered shape; supplying the outer electrode ink to come into contact with the chamfered shape region of the boundary portion of the second insulating material pattern and a region in which the first outer electrode pattern is exposed, to form a second outer electrode pattern to provide the entering portion and a portion of the outer electrode; supplying an internal electrode ink including a conductive material, to a predetermined region on the second insulating material pattern and at a portion of the second outer electrode pattern which is located on the chamfered shape region of the second insulating material pattern, to form an internal electrode pattern connected to the second outer electrode pattern; and supplying the insulating material ink to overlap the second insulating material pattern and cover the internal electrode pattern, to form a third insulating material pattern with the boundary portion including the chamfered shape.

The second through sixth steps preferably are performed repeatedly a plurality of times.

Since the first manufacturing method for the multilayer electronic component according to a preferred embodiment of the present invention includes the steps of forming an insulating material pattern; forming an outer electrode pattern forming the entering portion and a portion of the outer electrode; forming a next insulating material pattern; forming a next outer electrode pattern; forming an internal electrode pattern; and forming a further next insulating material pattern, and the second through sixth are preferably performed repeatedly a plurality of times as described above, it is possible to efficiently manufacture an multilayer electronic component according to a preferred embodiment of the present invention.

According to a preferred embodiment of the present invention, a manufacturing method for a multilayer electronic component is a manufacturing method for the multilayer electronic component, and includes the steps of supplying an insulating material ink including the insulating material included in each insulating material layer, to form a first insulating material pattern including a chamfered shape in which a boundary portion between an end portion and an upper surface is tilted relative to the upper surface or rounded; supplying an outer electrode ink including a conductive material to a chamfered shape region including the chamfered shape of the boundary portion of the first insulating material pattern and a region in which the first insulating material pattern is not located, the region which is adjacent to or in a vicinity of the end portion of the first insulating material pattern, and forming a first outer electrode pattern to provide the entering portion and a portion of the outer electrode; supplying the insulating material ink to a region of a surface of the first insulating material pattern in which the entering portion of the first outer electrode pattern is located, and a region in which the first insulating material pattern is exposed, to form a second insulating material pattern overlapping the first insulating material pattern and including the boundary portion including the chamfered shape; supplying an internal electrode ink including a conductive material to a predetermined region on the second insulating material pattern, to form an internal electrode pattern; supplying the outer electrode ink to come into contact with a region of the internal electrode pattern located on the chamfered shape region of the boundary portion of the second insulating material pattern and a region in which the first outer electrode pattern is exposed, to form a second outer electrode pattern to provide the entering portion and a portion of the outer electrode; and supplying the insulating material ink to overlap the second insulating material pattern and cover the internal electrode pattern, to form a third insulating material pattern with the boundary portion including the chamfered shape, wherein the second through sixth steps are performed repeatedly a plurality of times.

Also in the case of including the steps of forming an insulating material pattern; forming an outer electrode pattern forming the entering portion and a portion of the outer electrode; forming a next insulating material pattern; forming an internal electrode pattern; forming a next outer electrode pattern; and forming a further next insulating material pattern, and repeatedly performing the second through sixth steps a plurality of times, as described above, as in the second first manufacturing method for the multilayer electronic component according to a preferred embodiment of the present invention, it is possible to efficiently manufacture a multilayer electronic component according to a preferred embodiment of the present invention.

In a manufacturing method for a multilayer electronic component according to a preferred embodiment of the present invention, the insulating material ink, the internal electrode ink, and the outer electrode ink are preferably supplied by an ink jet method, for example.

By supplying the insulating material ink, the internal electrode ink, and the outer electrode ink by the ink jet method, it is possible to more efficiently manufacture the multilayer electronic component.

By using an ink jet method described above, it is possible to easily form the chamfered shape due to flow of the ink, without an additional step, so that it is possible to efficiently manufacture the electronic component according to a preferred embodiment of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described to explain the features of the present invention in more detail. In the preferred embodiments of the present invention, multilayer ceramic capacitors will be described as an example of a multilayer electronic component.

First Preferred Embodiment

Figure 1:
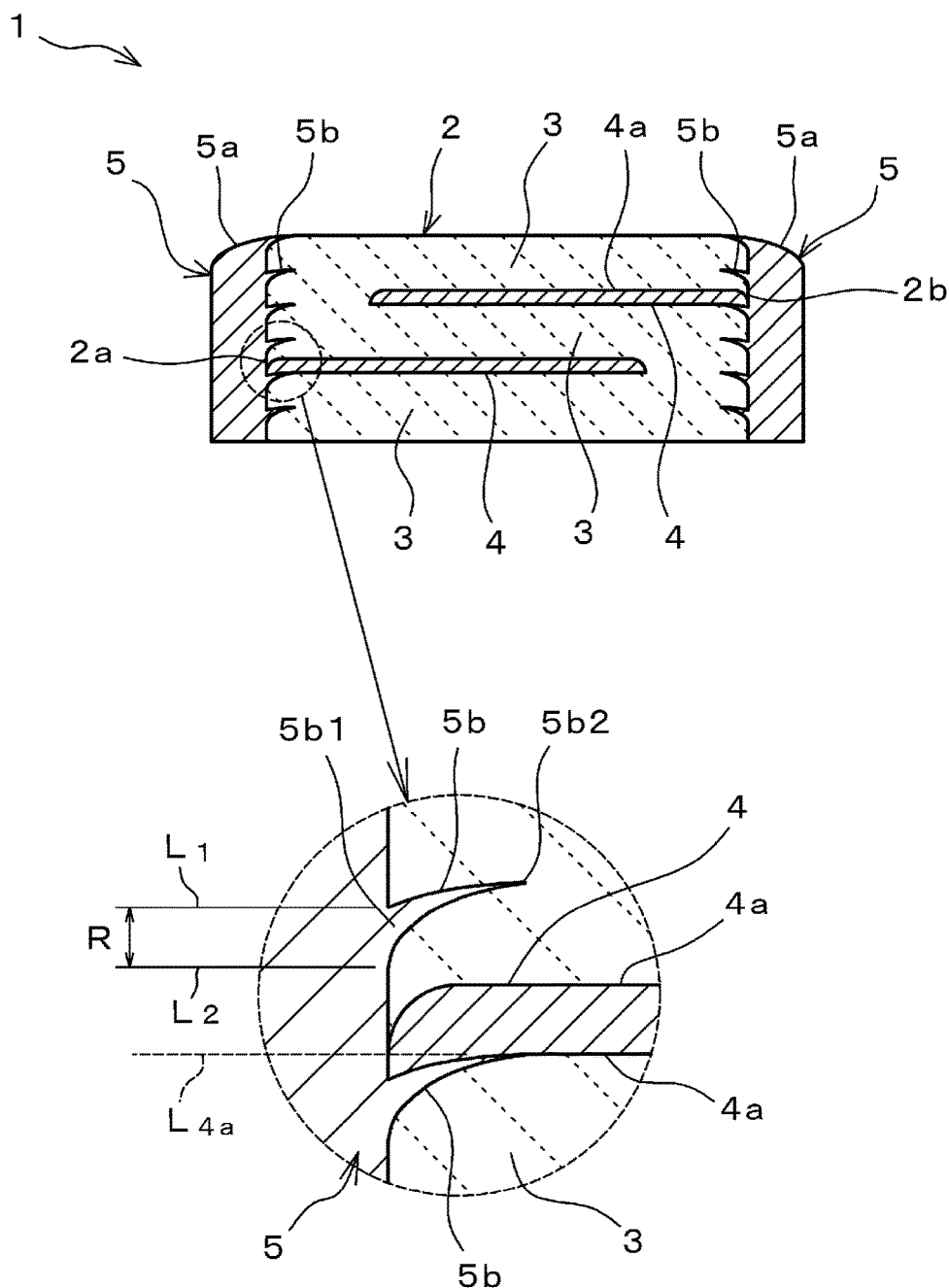
FIG. 1 is a cross-sectional view schematically showing a multilayer electronic component according to a first preferred embodiment of the present invention.

As shown in FIG. 1, a multilayer ceramic capacitor 1 according to a first preferred embodiment of the present invention includes an electronic component element 2 with laminated internal electrodes 4, an insulating material layer 3 located between the internal electrodes 4, and a pair of outer electrodes 5 provided on end portions 2a and 2b of the electronic component element 2. The insulating material layer 3 includes an insulating material.

The internal electrodes 4 extend to the end portions 2a and 2b of the electronic component element 2 at different sides, respectively, and the outer electrodes 5 are electrically conducted to the extended portions of the internal electrodes 4 extended to the end portions 2a and 2b.

In the multilayer ceramic capacitor 1, each outer electrode 5 includes an outer electrode main body 5a electrically conducted to the internal electrode 4, and a plurality of entering portions 5b that project from the outer electrode main body 5a as a base in a layer shape and enter into the electronic component element 2 through the end portions 2a and 2b of the electronic component element 2.

The layered entering portions 5b are respectively located at the same or substantially the same height positions as the internal electrodes 4 and at height positions different from those of the internal electrodes 4, in a height direction, that is, a lamination direction, of the electronic component element 2 which is a multilayer structure body. In other words, the layered entering portions 5b are respectively located at positions within the ranges where the internal electrodes 4 are provided in the height direction, and at positions below or above the ranges where the internal electrodes 4 are provided.

A plurality of entering portions 5b may be provided at each of the above-described positions in the height direction.

Each of the layered entering portions 5b includes a slope with respect to a principal surface 4a in a flat region that includes a main portion of the internal electrode 4.

In the first preferred embodiment, each of the layered entering portions 5b includes a slope with respect to the principal surface 4a in the flat region of the internal electrode 4, and, as shown in an enlarged portion of FIG. 1, when lines $L_1$ and $L_2$ are drawn to be parallel or substantially parallel to a line $L_{4a}$ drawn from the principal surface 4a of the internal electrode 4 and pass through both ends of a base end portion 5b1 of the entering portion 5b, the position of a distal end portion 5b2 of the entering portion 5b as seen in a direction orthogonal or substantially orthogonal to the lines $L_1$ and $L_2$ is located at an outer side portion with respect to a region R defined by the lines $L_1$ and $L_2$.

In the first preferred embodiment, each of the layered entering portions 5b includes a tapered shape in which the thickness of each of the entering portions 5b gradually decreases from the base end portion 5b1 to the distal end portion 5b2, and also includes a curved shape from the base end portion 5b1 to the distal end portion 5b2. In addition, the thickness of the base end portion 5b1 of each of the layered entering portions 5b is larger than the thickness of each internal electrode 4.

The length dimension of each entering portion 5b from the base end portion 5b1 to the distal end portion 5b2 (that is, in a direction orthogonal or substantially orthogonal to the end portions 2a and 2b) is larger than the thickness dimension of the base end portion 5b1. However, for example, the length dimension is set to space apart the distal end portion 5b2 of each entering portion 5b at the end portion 2a side from the extended internal electrode 4 at the end portion 2b side by a sufficient distance. Here, a "sufficient distance" is defined as a distance longer than the distance between the opposed internal electrodes 4.

An example of the dimensions of the multilayer ceramic capacitor 1 and the internal electrodes 4 and the outer electrodes 5 is described below.

Length of multilayer ceramic capacitor: about 8 mm
Width of multilayer ceramic capacitor: about 6 mm
Height (in the lamination direction) of multilayer ceramic capacitor: about 4 mm
Thickness of each internal electrode: about 0.3 µm to about 10 µm
Thickness of base end portion of each entering portion of each outer electrode: about 0.5 µm to about 20 µm
Length of each entering portion of each outer electrode from base end portion to distal end portion: about 2 µm to about 400 µm In the multilayer ceramic capacitor 1, a calcium zirconate ($CaZrO_3$) ceramic material, which is a dielectric ceramic material, is included as the insulating material layers 3.

In addition, Ni is included as a metallic material of each internal electrode 4, and Ni is also included as a metallic material of each outer electrode 5.

$CaZrO_3$, which is the material included in each insulating material layer 3, is also included as a common material in each internal electrode 4 and each outer electrode 5. Accordingly, the coefficient of linear expansion of each internal electrode 4 and each outer electrode 5 is similar to the coefficient of linear expansion of each insulating material layer 3.

The content ratio of the common material in each internal electrode 4 is preferably not less than about 20 vol % of the entire internal electrode, for example.

In addition, the content ratio of the common material in each outer electrode 5 is preferably not less than about 30 vol % and not greater than about 70 vol %, of the entire outer electrode, for example.

Each outer electrode 5 includes a higher content ratio of the common material than the content ratio of the common material in each internal electrode 4.

The content ratio of the common material in each internal electrode 4 and each outer electrode 5 is a value obtained when a sample including a volume of about $1.0 \times 10^{-5}$ mm$^3$ is taken from the internal electrode or the outer electrode and measured, for example. The average of values obtained by taking a plurality of samples is referred to as the content ratio of the common material.

A non-limiting example of a manufacturing method for the multilayer ceramic capacitor 1 is described below.

In the first preferred embodiment, an insulating material ink i1 including the insulating material of each insulating material layer 3, an internal electrode ink i3 including a conductive material and the common material of each internal electrode 4, and an outer electrode ink i2 including a conductive material and the common material of each outer electrode 5 are sprayed by an ink jet device (not shown), according a method described below, to form an insulating material pattern, an internal electrode pattern, and an outer electrode pattern in a predetermined order, thus manufacturing the multilayer ceramic capacitor 1 including the structure shown in FIG. 1.

Each of the above-described inks may include an ink that solidifies by drying a solvent, an ink that solidifies by irradiation with infrared rays or ultraviolet rays, or the like. The viscosity of each ink when the ink is applied to a supply target region is, for example, not greater than about 2000 mPa·s, and a boundary portion between an end portion and an upper surface of each pattern includes a round or substantially round or chamfered shape due to flow of the ink, until solidification.

To manufacture the multilayer ceramic capacitor 1, for example, an ink including a $CaZrO_3$ pigment, a resin, and a solvent is prepared as the insulating material ink i1. A pigment volume concentration (PVC), which is a volume ratio of the pigment in the solid component of the ink is, for example, not less than about 65% and not greater than about 95%, and the solid component concentration is, for example, not less than about 10 vol % and not greater than about 27 vol %.

For example, an ink including an Ni pigment as a metal pigment, a $CaZrO_3$ pigment as a common material pigment, a resin, and a solvent is prepared as the internal electrode ink i3. The pigment volume concentration (PVC) of the ink is, for example, not less than about 70% and not greater than about 95%, and the solid component concentration of the ink is not less than about 9 vol % and not greater than about 20.5 vol %.

For example, an ink including an Ni pigment as a metal pigment, a $CaZrO_3$ pigment as a common material pigment, a resin, and a solvent is prepared as the outer electrode ink i2. The pigment volume concentration (PVC) of the ink is, for example, not less than about 70% and not greater than about 95%, and the solid component concentration of the ink is not less than about 9 vol % and not greater than about 20.5 vol %.

Then, the multilayer ceramic capacitor is manufactured through steps such as forming a multilayer body, firing, and the like, as described below.

Figure 2A:
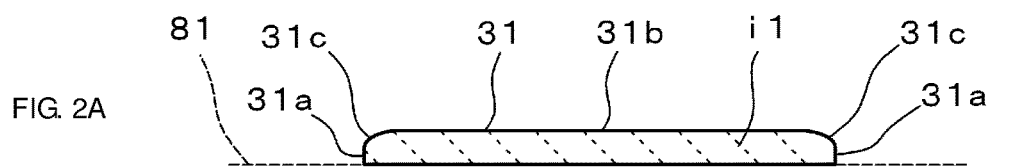
FIGS. 2A to 2D are diagrams illustrating steps of a manufacturing method for the multilayer electronic component according to the first preferred embodiment of the present invention.

(1) First, as shown in FIG. 2A, the insulating material ink i1 is supplied onto a base material 81 by the ink jet device, to form an insulating material pattern 31 of a first layer. The insulating material pattern 31 is formed in a planar shape, and the planar shape of the insulating material 31 includes a rectangular or substantially rectangular shape corresponding to the planar length dimension and width dimension of the electronic component element 2. Accordingly, the insulating material pattern 31 of the first layer is formed on the base material 81, and a boundary portion 31c between each of both end portions 31a and an upper surface 31b of the insulating material pattern 31 includes a round or substantially round or chamfered shape.

Similar to the insulating material pattern 31 of the first layer, an insulating material pattern 32 of a second layer includes a boundary portion 32c between each of both end portions and an upper surface with a round or substantially round or chamfered shape. The subsequent insulating material patterns include the same or similar features.

Figure 2B:
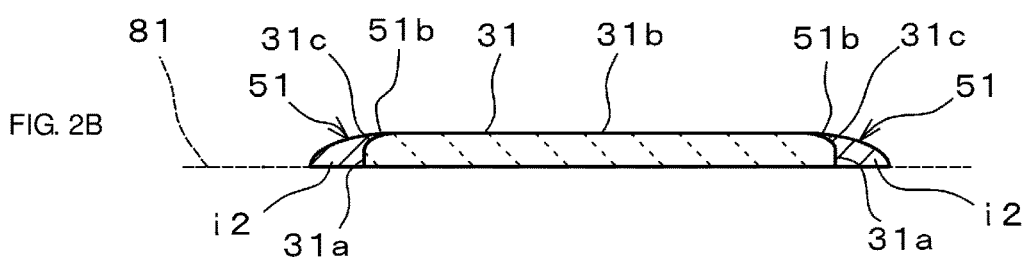

(2) Next, as shown in FIG. 2B, the outer electrode ink i2 is supplied to a region of each boundary portion 31c including a chamfered shape (hereinafter, referred to as "chamfered shape region") and a region, on the base material 81, which is adjacent to or in a vicinity of each of both end portions 31a of the insulating material pattern 31 (that is, a region in which no insulating material pattern has been formed), to form a pair of outer electrode patterns 51 of the first layer. Accordingly, the outer electrode patterns 51 of the first layer each including an edge portion with a substantially round shape are formed. The outer electrode patterns 51 of the first layer correspond to portions of the entering portions 5b and the outer electrode main bodies 5a after firing. The following outer electrode patterns include the same or similar features.

Figure 2C:
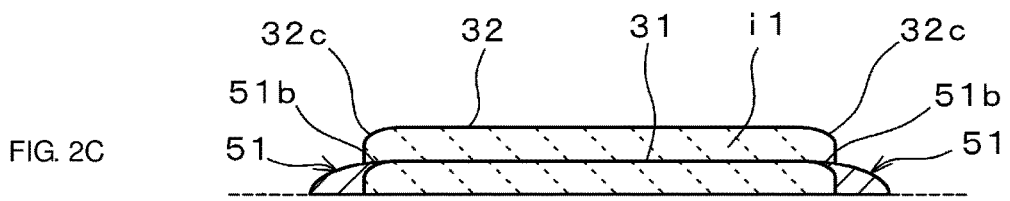

(3) Next, as shown in FIG. 2C, the insulating material ink i1 is supplied to a region of the surface of the insulating material pattern 31 on which an entering portion 51b of each outer electrode pattern 51 is located, and to a region in which the insulating material pattern 31 is exposed, to form the insulating material pattern 32 of the second layer overlapping the insulating material pattern 31 of the first layer.

Figure 2D:
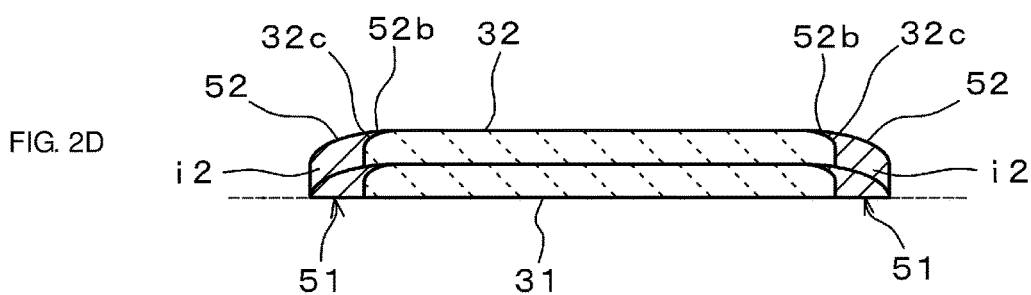

(4) Next, as shown in FIG. 2D, the outer electrode ink i2 is supplied and comes into contact with the chamfered shape regions of the boundary portions 32 of the insulating material pattern 32 of the second layer and a region in which each outer electrode pattern 51 is exposed, to form outer electrode patterns 52 of the second layer. In the first preferred embodiment, the outer electrode patterns 52 cover substantially the entireties of the chamfered shape regions of the boundary portions 32c of the insulating material pattern 32 of the second layer and the region in which each outer electrode pattern 51 is exposed.

Figure 3A:
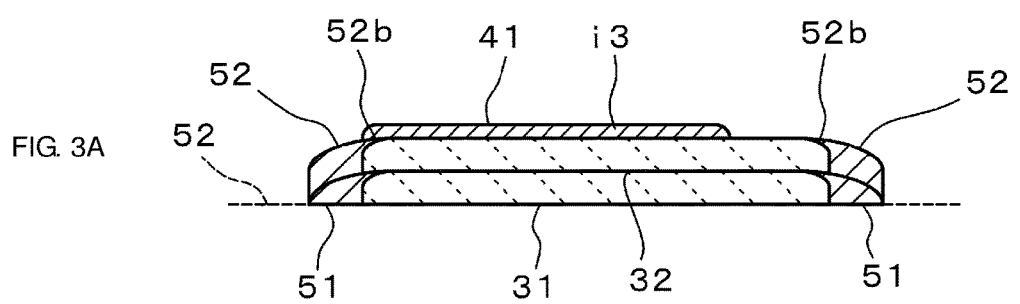
FIGS. 3A and 3B are diagrams illustrating other steps of the manufacturing method for the multilayer electronic component according to the first preferred embodiment of the present invention.

(5) Next, as shown in FIG. 3A, the internal electrode ink i3 is supplied to a predetermined region of the insulating material pattern 32 such that, at portions of the outer electrode patterns 52 formed on the chamfered shape regions, the internal electrode ink i3 is connected to the outer electrode pattern 52 at the left side and is not connected to the outer electrode pattern 52 at the right side, to form an internal electrode pattern 41 of the first layer. A region of the internal electrode pattern 41 that is connected to the outer electrode pattern 52 is to be an extended portion of the internal electrode 4, as shown in FIG. 1.

In the first preferred embodiment, the internal electrode pattern 41 is thinner than the thickness of each of the above-described insulating material patterns 31 and 32 and outer electrode patterns 51 and 52.

In addition, the internal electrode pattern 41 is not exposed at an outer side portion with respect to end portions, in a width direction of the insulating material patterns 31 and 32.

Figure 3B:
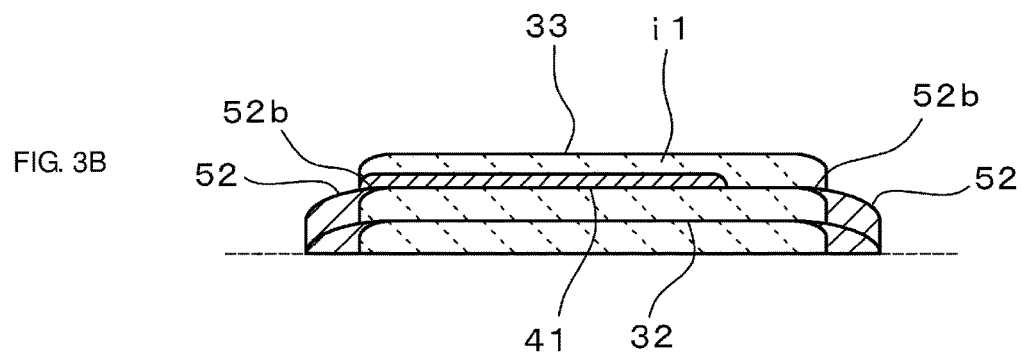

(6) Next, as shown in FIG. 3B, the insulating material ink i1 is supplied and covers a region of the surface of the insulating material pattern 32 on which the entering portion 52b of each outer electrode pattern 52, a region in which the insulating material pattern 32 is exposed, and the internal electrode pattern 41, to form an insulating material pattern 33 of a third layer overlapping the insulating material pattern 32 of the second layer.

Figure 4:
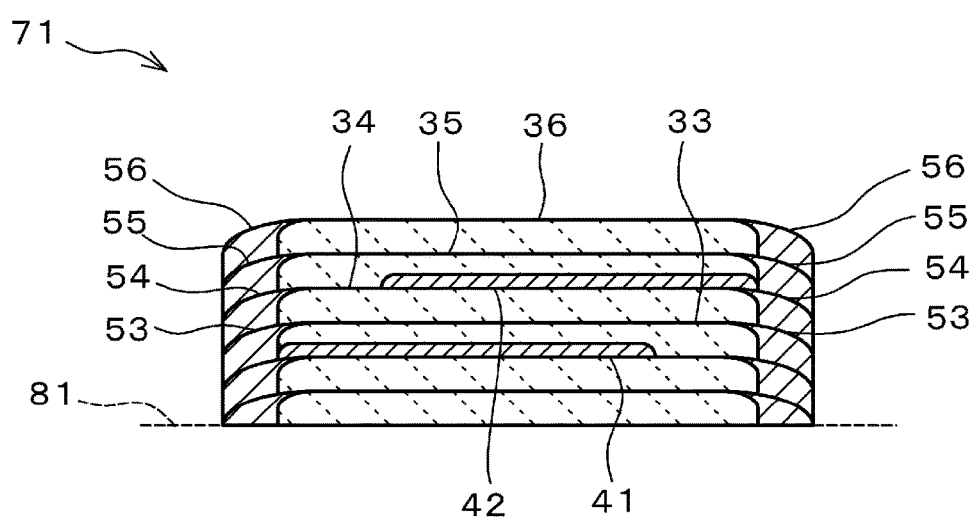
FIG. 4 is a diagram illustrating a further step of the manufacturing method for the multilayer electronic component according to the first preferred embodiment of the present invention.

Thereafter, by a method equivalent to the above-described method, outer electrode patterns 53 of the third layer, an insulating material pattern 34 of a fourth layer, outer electrode patterns 54 of the fourth layer, an internal electrode pattern (an internal electrode pattern extended at the side opposite to the internal electrode pattern 41 of the first layer) 42 of the second layer, an insulating material pattern 35 of a fifth layer, outer electrode patterns 55 of the fifth layer, an insulating material pattern 36 of a sixth layer, and outer electrode patterns 56 of the sixth layer, are sequentially formed to provide a multilayer body 71 including a structure as shown in FIG. 4.

Then, the multilayer body 71 is separated from the base material 81, and the entirety of the multilayer body 71 is fired simultaneously. Accordingly, the multilayer ceramic capacitor 1 including the structure shown in FIG. 1 is obtained.

By repeating the above steps (2) to (6), a multilayer ceramic capacitor including a predetermined lamination number is able to be provided.

If a plurality of entering portions 5b are located at positions lower than a range of positions of the internal electrodes 4, the above steps (3) and (4) only need to be performed repeatedly a predetermined number of times before the above step (5) is performed.

If a plurality of entering portions 5b are located between the opposed internal electrodes 4, the above steps (3) and (4) only need to be performed repeatedly a predetermined number of times, for example, between a step of forming the internal electrode pattern 41 of the first layer and a step of forming the internal electrode pattern 42 of the second layer.

It is possible to form the next outer electrode pattern that defines an entering portion and a portion of the outer electrode by interchanging the orders of the above (4) and (5) with each other, supplying the internal electrode ink including the conductive material of each internal electrode to a predetermined region on the next insulating material pattern to form an internal electrode pattern in (4), and supplying the outer electrode ink to come into contact with a region of the internal electrode pattern located on the chamfered shape region of the boundary portion of the next insulating material pattern, and the region in which the outer electrode pattern is exposed, in (5).

Second Preferred Embodiment

Figure 5:
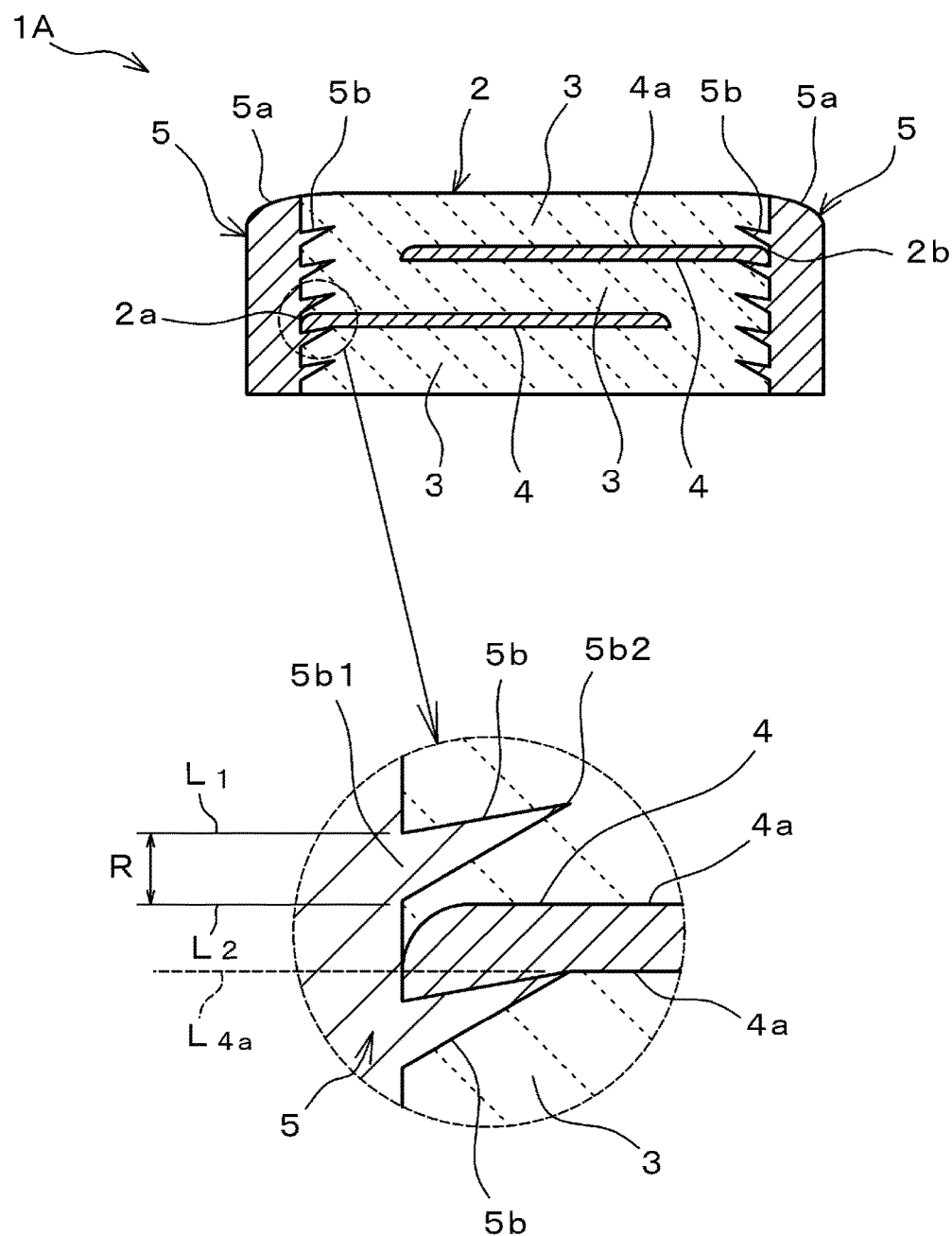
FIG. 5 is a cross-sectional view schematically showing a multilayer electronic component according to a second preferred embodiment of the present invention.
Figure 6:
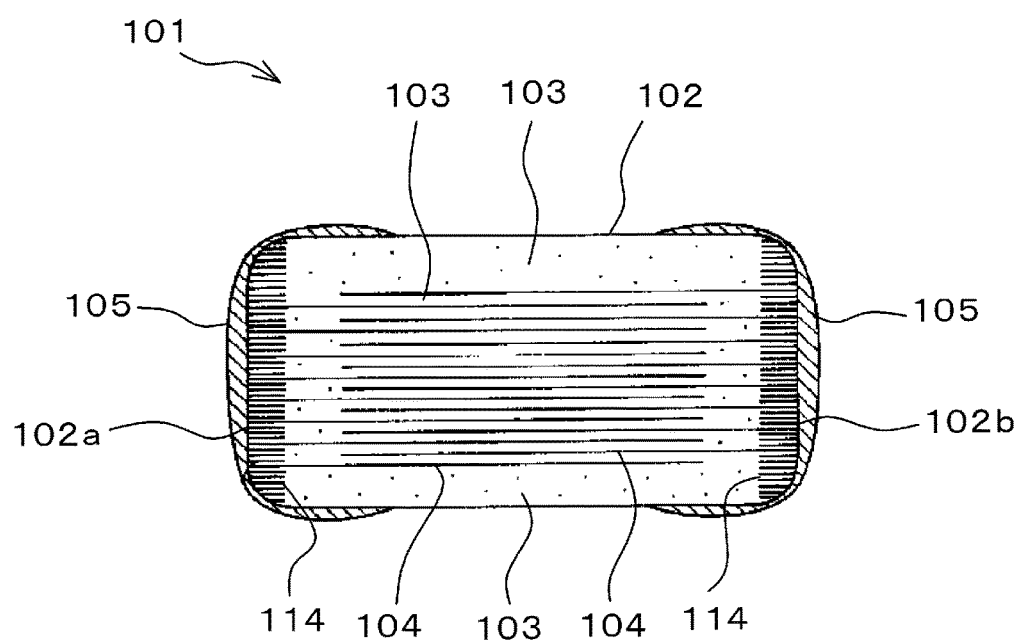
FIG. 6 is a cross-sectional view of a multilayer electronic component of the related art.

FIG. 5 is a diagram showing a multilayer ceramic capacitor 1A according to a second preferred embodiment of the present invention.

In the first preferred embodiment described above, each of the layered entering portions 5b includes a curved shape. However, the multilayer ceramic capacitor 1A according to the second preferred embodiment includes entering portions 5b with tapered wedge shapes defined by two flat surfaces that are not curved in a cross-sectional shape.

The second preferred embodiment preferably includes many features that are the same or substantially the same the features of the first preferred embodiment. In FIG. 5, portions designated by the same reference characters as in FIG. 1 indicate the same or corresponding portions.

Also in the multilayer ceramic capacitor 1A according to the second preferred embodiment, for example, since the entering portions 5b are included and each entering portion 5b is tilted relative to the principal surface 4a of the internal electrode pattern, a multilayer ceramic capacitor with high reliability of joining the outer electrodes 5 to the electronic component element 2 is provided similar to the first preferred embodiment.

Third Preferred Embodiment

A multilayer electronic component according to a third preferred embodiment of the present invention includes a structure in which a common material included in an outer electrode and an internal electrode penetrates through a layered entering portion and is connected to upper and lower insulating material layers may be exemplified.

The multilayer electronic component including the features described above may be manufactured by increasing the ratio of the common material included in the outer electrode.

In a cross-sectional view of the multilayer electronic component as seen from a direction orthogonal or substantially orthogonal to a lamination direction, the metallic material of the entering portion of the outer electrode is seen as if interrupted. When the entire outer electrode is considered three-dimensionally, the metallic materials of the entering portions are connected to each other in a mesh shape, and are thus able to sufficiently exert their corresponding functions.

As a structure, a state of being stuck into the insulator in a three-dimensionally complicated manner is obtained, and the outer electrodes are less likely to come out from the electronic component element.

Modifications to the Preferred Embodiments

In the preferred embodiments described above, the multilayer ceramic capacitors have been described as examples. However, the preferred embodiments are also applicable to various multilayer electronic components such as a multilayer inductor, a multilayer thermistor, and a multilayer LC composite component.

However, the number of the insulating material layers, the number of the internal electrodes, the number of the entering portions of each outer electrode, and the position at which each outer electrode is located, in the multilayer electronic component, are not limited to the preferred embodiments described above.

The shape of each internal electrode is not particularly limited, and the internal electrode may electrically connect the outer electrode at one end side and the outer electrode at the other end side to each other.

Although an example is described above where the multilayer electronic component is manufactured by the ink jet device, it is also possible to manufacture the multilayer electronic component by using a screen printing device or a dispenser, for example.

In the preferred embodiments described above, solidification of each ink may be individually performed for each layer, or may be performed at one time for a plurality of layers. Alternatively, a combination of steps for solidification of each ink may be performed.

As a method for the solidification, a method with drying, or a method with ultraviolet rays or the like, etc. may be used, for example. As a drying method, methods with sent air, infrared rays, hot air, and decompression, etc. may be used, and may be included in combination.

The present invention is not limited to the preferred embodiments described above regarding the other points as well, and various applications and changes may be added within the scope of the present invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer electronic component comprising:
    an electronic component element including a plurality of insulating material layers that include an insulating material, and a plurality of internal electrodes that include an electrode material, the electronic component element including a structure in which extended portions that are portions of the plurality of internal electrodes are extended to end portions of a multilayer body in which the plurality of internal electrodes are laminated with the insulating material layer located between the plurality of internal electrodes; and outer electrodes disposed at end portions of the electronic component element and electrically conducted to the extended portions of the plurality of internal electrodes; wherein each of the outer electrodes and the plurality of internal electrodes includes a metallic material as a principal component, and a common material with a composition equivalent to or the same as that of the material of each insulating material layer, and a content ratio of the common material in the outer electrode is higher than a content ratio of the common material in the internal electrode; and each of the outer electrodes includes:
  an outer electrode main body electrically conducted to the internal electrode; and
  a plurality of entering portions that project from the outer electrode main body as a base end in a layer shape, enter into inside of the electronic component element from the end portion of the electronic component element, and include a material that is the same or substantially the same as that of the outer electrode main body; and
  at least one of the entering portions in the layer shape includes a slope that is inclined with respect to a principal surface in a flat region including a main portion of at least one of the plurality of internal electrodes, the principal surface of the at least one of the internal electrodes extending in a direction that is perpendicular or substantially perpendicular to a lamination direction of the plurality of insulating material layers and the plurality of internal electrodes.

2. The multilayer electronic component according to claim 1, wherein the at least one of the entering portions includes a base end portion including a thickness larger than that of a distal end portion of the at least one of the entering portions and larger than that of the internal electrode.

3. The multilayer electronic component according to claim 1, wherein the at least one of the entering portions includes a curved shape from a base end portion to a distal end portion of the at least one of the entering portions.

4. The multilayer electronic component according to claim 1, wherein the at least one of the entering portions includes a tapered wedge shape defined by two flat surfaces that are not curved in a cross-sectional shape.

5. The multilayer electronic component according to claim 1, wherein at least one of the entering portions is located at a same or substantially the same height, in a lamination direction, as at least one of the plurality of internal electrodes.

6. The multilayer electronic component according to claim 1, wherein the common material in an extended portion of each outer electrode is connected to each of the insulating material layers above and below the extended portion.

7. The multilayer electronic component according to claim 1, wherein each of the outer electrodes includes a higher content ratio of the common material than a content ratio of the common material included in the plurality of internal electrodes.

8. The multilayer electronic component according to claim 1, wherein the insulating material included in each of the insulating material layers is a ceramic material.

9. The multilayer electronic component according to claim 1, wherein the insulating material included in each of the insulating material layers is a dielectric material.

10. The multilayer electronic component according to claim 1, wherein the common material includes a ceramic material.

11. A manufacturing method for the multilayer electronic component according to claim 1, the manufacturing method comprising the steps of:
  (1) supplying an insulating material ink including the insulating material included in each insulating material layer, to form a first insulating material pattern including a chamfered shape in which a boundary portion between an end portion and an upper surface is tilted relative to the upper surface or rounded;
  (2) supplying an outer electrode ink including a conductive material to a chamfered shape region including the chamfered shape of the boundary portion of the first insulating material pattern and a region in which the first insulating material pattern is not formed, the region which is adjacent to or in a vicinity of the end portion of the first insulating material pattern, and forming a first outer electrode pattern to provide the entering portion and a portion of the outer electrode;
  (3) supplying the insulating material ink to a region of a surface of the first insulating material pattern in which the entering portion of the first outer electrode pattern is located, and a region in which the first insulating material pattern is exposed, to form a second insulating material pattern overlapping the first insulating material pattern and including the boundary portion including the chamfered shape;
  (4) supplying the outer electrode ink to come into contact with the chamfered shape region of the boundary portion of the second insulating material pattern and a region in which the first outer electrode pattern is exposed, to form a second outer electrode pattern to provide the entering portion and a portion of the outer electrode;
  (5) supplying an internal electrode ink including a conductive material, to a predetermined region on the second insulating material pattern and at a portion of the second outer electrode pattern which is located on the chamfered shape region of the second insulating material pattern, to form an internal electrode pattern connected to the second outer electrode pattern; and
  (6) supplying the insulating material ink to overlap the second insulating material pattern and cover the internal electrode pattern, to form a third insulating material pattern with the boundary portion including the chamfered shape; wherein
  the steps (2) to (6) are performed repeatedly a plurality of times.

12. The manufacturing method for the multilayer electronic component according to claim 11, wherein the insulating material ink, the internal electrode ink, and the outer electrode ink are supplied by an ink jet method.

13. The manufacturing method for the multilayer electronic component according to claim 11, wherein steps (3) and (4) are performed repeatedly a plurality of times before step (5) is performed.

14. A manufacturing method for the multilayer electronic component according to claim 1, the manufacturing method comprising the steps of:
(1) supplying an insulating material ink including the insulating material included in each insulating material layer, to form a first insulating material pattern including a chamfered shape in which a boundary portion between an end portion and an upper surface is tilted relative to the upper surface or rounded;
(2) supplying an outer electrode ink including a conductive material to a chamfered shape region including the chamfered shape of the boundary portion of the first insulating material pattern and a region in which the first insulating material pattern is not located, the region which is adjacent to or in a vicinity of the end portion of the first insulating material pattern, and forming a first outer electrode pattern to provide the entering portion and a portion of the outer electrode;
(3) supplying the insulating material ink to a region of a surface of the first insulating material pattern in which the entering portion of the first outer electrode pattern is located, and a region in which the first insulating material pattern is exposed, to form a second insulating material pattern overlapping the first insulating material pattern and including the boundary portion including the chamfered shape;
(4) supplying an internal electrode ink including a conductive material to a predetermined region on the second insulating material pattern, to form an internal electrode pattern;
(5) supplying the outer electrode ink to come into contact with a region of the internal electrode pattern located on the chamfered shape region of the boundary portion of the second insulating material pattern and a region in which the first outer electrode pattern is exposed, to form a second outer electrode pattern to provide the entering portion and a portion of the outer electrode; and
(6) supplying the insulating material ink to overlap the second insulating material pattern and cover the internal electrode pattern, to form a third insulating material pattern with the boundary portion including the chamfered shape; wherein
the steps (2) to (6) are performed repeatedly a plurality of times.

15. The manufacturing method for the multilayer electronic component according to claim 14, wherein the insulating material ink, the internal electrode ink, and the outer electrode ink are supplied by an ink jet method.

* * * * *